United States Patent
Iden et al.

(10) Patent No.: US 9,065,100 B2
(45) Date of Patent: Jun. 23, 2015

(54) FUEL CELL SYSTEM WITH REGENERATION OF ELECTRODE ACTIVITY DURING START OR STOP

(75) Inventors: Hiroshi Iden, Yokosuka (JP); Ryoichi Shimoi, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 1395 days.

(21) Appl. No.: 12/160,859

(22) PCT Filed: Feb. 1, 2007

(86) PCT No.: PCT/IB2007/000246
§ 371 (c)(1),
(2), (4) Date: Apr. 28, 2010

(87) PCT Pub. No.: WO2007/088471
PCT Pub. Date: Aug. 9, 2007

(65) Prior Publication Data
US 2010/0203407 A1 Aug. 12, 2010

(30) Foreign Application Priority Data
Feb. 3, 2006 (JP) .................. 2006-027155

(51) Int. Cl.
*H01M 8/04* (2006.01)
*H01M 8/22* (2006.01)
*H01M 8/10* (2006.01)

(52) U.S. Cl.
CPC ...... *H01M 8/04828* (2013.01); *H01M 8/04223* (2013.01); *H01M 8/0432* (2013.01); *H01M 8/04492* (2013.01); *H01M 8/04619* (2013.01); *H01M 8/04701* (2013.01); *H01M 8/04798* (2013.01); *H01M 8/1002* (2013.01); *Y02E 60/521* (2013.01)

(58) Field of Classification Search
CPC .......... H01M 8/04223; H01M 8/0432; H01M 8/04492; H01M 8/04619; H01M 8/04798; H01M 8/04828; H01M 8/04701; H01M 8/1002
USPC .......... 429/429, 428, 423, 415, 431, 432, 535
See application file for complete search history.

(56) References Cited

U.S. PATENT DOCUMENTS

| | | | |
|---|---|---|---|
| 6,180,272 B1* | 1/2001 | Byrne et al. .................. | 429/429 |
| 6,399,231 B1* | 6/2002 | Donahue et al. .............. | 429/431 |
| 6,881,510 B1 | 4/2005 | Gyoten et al. | |
| 2002/0001741 A1* | 1/2002 | Kawasumi et al. ............. | 429/20 |
| 2002/0098393 A1* | 7/2002 | Dine et al. ....................... | 429/13 |
| 2003/0118883 A1* | 6/2003 | Breault et al. .................. | 429/26 |
| 2003/0235724 A1* | 12/2003 | Ord et al. ........................ | 429/19 |
| 2004/0001980 A1 | 1/2004 | Balliet et al. | |

(Continued)

FOREIGN PATENT DOCUMENTS

| | | |
|---|---|---|
| EP | 1 536 503 | 6/2005 |
| JP | 2001-85037 | 3/2001 |

(Continued)

*Primary Examiner* — Kenneth Douyette
(74) *Attorney, Agent, or Firm* — Drinker Biddle & Reath LLP

(57) ABSTRACT

A performance recovery operation for a fuel cell system effectively restores a fuel electrode such that, upon starting or stopping of operation of the fuel cell, both fuel and oxidizing electrodes are disposed in a hydrogen atmosphere and then the fuel electrode is maintained at a higher potential level than in a normal operation.

1 Claim, 14 Drawing Sheets

(56) References Cited

U.S. PATENT DOCUMENTS

2005/0123814 A1* 6/2005 Calhoon .................. 429/26
2005/0271911 A1  12/2005 Kuriki et al.

FOREIGN PATENT DOCUMENTS

| | | | | |
|---|---|---|---|---|
| JP | 2002-93448 | 3/2002 | | |
| JP | 2003-123812 | 4/2003 | | |
| JP | 2003-132923 | 5/2003 | | |
| JP | 2003-272686 | 9/2003 | | |
| JP | 2004022460 A * | 1/2004 | ............. | H01M 8/04 |
| JP | 2005-209609 | 8/2005 | | |
| JP | 2005-259368 | 9/2005 | | |
| JP | 2005-276552 | 10/2005 | | |
| KR | 10-1043893 | 6/2011 | | |
| WO | WO 01/99218 | 12/2001 | | |

* cited by examiner

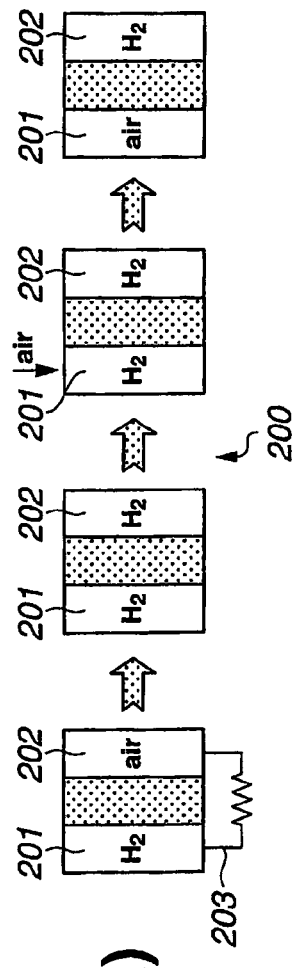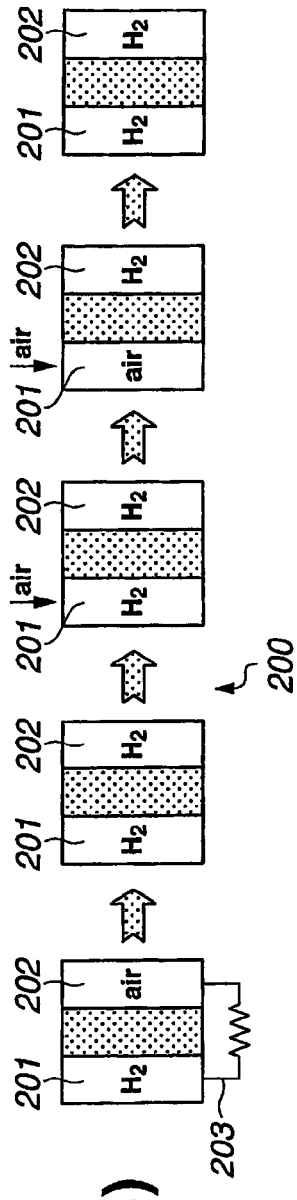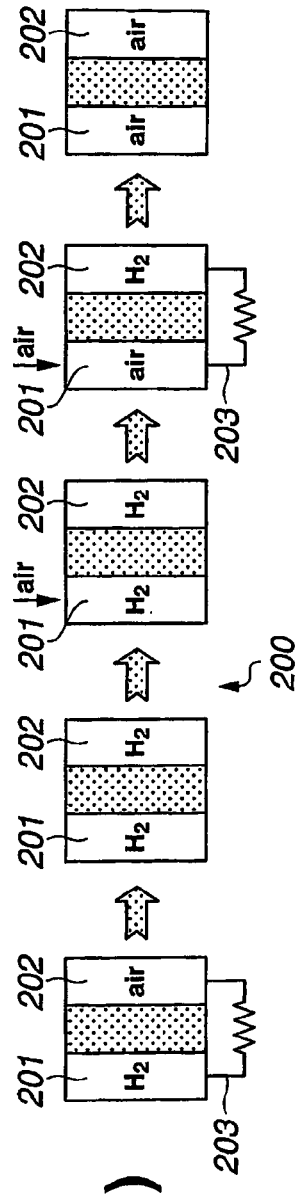
Fig.2 (A) Fig.2 (B) Fig.2 (C)

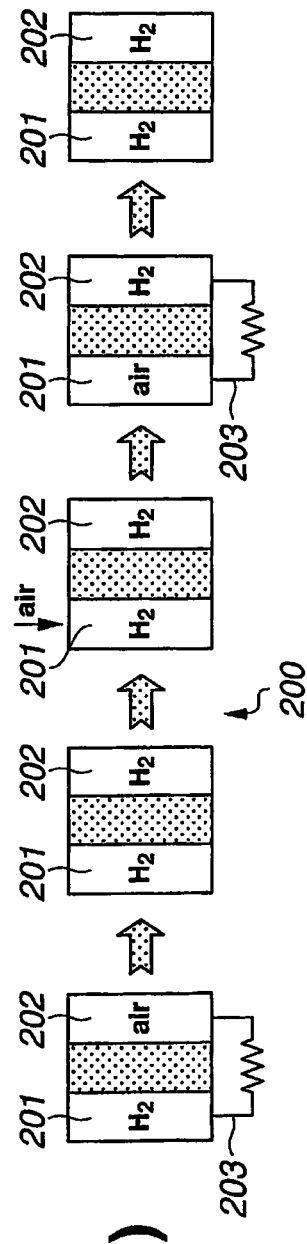
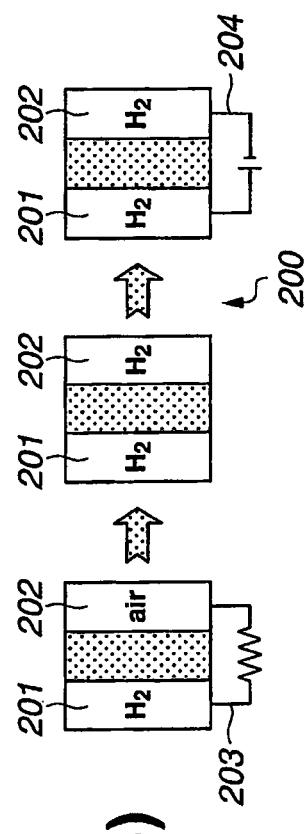
Fig.3 (A)
Fig.3 (B)

FUEL CELL SYSTEM WITH REGENERATION OF ELECTRODE ACTIVITY DURING START OR STOP

CROSS-REFERENCE TO RELATED APPLICATIONS

This application claims priority to Japanese Patent Application No. 2006-027155, filed Feb. 3, 2006, the disclosure of which is incorporated by reference herein in its entirety.

BACKGROUND OF THE INVENTION

1. Field of the Invention
The invention relates to a fuel cell system.
2. Description of Related Art
A fuel cell is a device that, by continuously replenishing fuel as well as discharging waste by-products of the fuel, directly converts chemical energy of fuel to electrical energy. In general, fuel cells are characterized by high power generating efficiency, reduced amounts of air pollutants, and low noise.

A related fuel cell structure may include a plurality of cells, or power generator units. Each cell may include sets of gas diffusion electrodes and corresponding separators that are attached to opposite sides of an electrolyte. Each of the separators may include a respective gas passage. Electrical power is generated in a cell when a fuel gas, such as hydrogen gas or the like, is supplied via the fuel gas passage to the fuel gas diffusion electrode (also called a "fuel electrode") attached on one side of the cell and when an oxidizing gas, such as air containing oxygen, is supplied via the oxidizing gas passage to the oxygen gas diffusion electrode (also called an "oxygen electrode" or an "oxidizing electrode") attached on the opposite side of the cell. The fuel is oxidized and a change of free energy that is induced thereby produces electrical energy.

A related fuel cell known as a polymer electrolyte fuel cell includes a membrane electrode assembly (MEA) in each cell. In particular, a polymer electrolyte membrane includes electrode catalyst layers that are disposed on opposite sides of the membrane, and separators that supply different gases to the surfaces of the catalyst layers on the opposite sides of the membrane. A first separator supplies hydrogen as the fuel gas to the fuel electrode disposed on a first side of the membrane, and a second separator supplies air as an oxidizing gas to the oxidizing electrode disposed on a second side of the membrane. In the related fuel cell, the electrode catalyst layers include a catalyst such as platinum on a carbon carrier.

The related polymer electrolyte membrane exhibits hydrogen ion conductivity when containing water, and thus, the fuel gas that is fed to the fuel cell is usually humidified in advance. Furthermore, since the reaction at the oxidizing electrode produces water, water is constantly contained in the cell.

Accordingly, after a long period of operation by the related fuel cell, various ionic impurities and inorganic and organic impurities contained in carbon materials, as well as seal materials, plastic materials and metallic materials used in the construction of the related fuel cell, are dissolved in the water contained in the cell. Furthermore, air that is supplied to the fuel cell from the outside inevitably contains air pollutants, such as small quantities of nitrogen oxides and sulfur oxides, and the fuel gas tends to gather metallic oxides during passage through a hydrogen purifier.

These various impurities mentioned above are collected on the electrolyte membrane and the catalyst reaction layers of oxygen electrode and fuel electrode, which reduces conductivity of the polymer electrolyte and diminishes activity of the catalyst reaction. As a result, the cell performance gradually deteriorates over time as the fuel cell is operated. Furthermore, in a related fuel cell in which the separators are formed with metal plates, the electrolyte membrane and catalyst reaction layers may be significantly damaged by metal ions dissolved from the metal separators.

An example of a related fuel cell system is disclosed in Japanese Laid-open Patent Application 2001-85037, which describes applying a high current density load to a fuel cell that has deteriorated in performance.

BRIEF SUMMARY OF THE INVENTION

However, applying high current density loads to the fuel cell may cause the oxidizing electrode side to produce water and thus effective performance recovery of the fuel electrode is not achieved.

In an embodiment of a fuel cell system, there is provided a controller that puts a fuel electrode and an oxidizing electrode into a hydrogen atmosphere when operation of the fuel cell is started or stopped, and then the fuel electrode is kept at a higher potential than in normal operation. Accordingly, it becomes possible to desorb impurities from the catalyst surfaces due to the oxidation reaction.

In an embodiment, there is provided a fuel cell system that includes a fuel cell for generating electricity. The fuel cell includes fuel and oxidizing electrodes that are disposed respectively on opposite sides of an electrolyte membrane, and the fuel cell generates electricity in response to a fuel gas and an oxidizing gas being supplied respectively to the fuel and oxidizing electrodes. The fuel cell system includes a controller that disposes the fuel and oxidizing electrodes in a first hydrogen atmosphere during starting and stopping operations of the fuel cell, and then maintains the fuel electrode at a higher potential.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIGS. 2(A) to 2(C) are a series of schematic drawings that illustrate changes in state of both a fuel electrode and an oxidizing electrode during a fuel cell performance recovery operation.

FIGS. 3(A) and 3(B) are a series of schematic drawings that illustrate changes in state of both the fuel electrode and the oxidizing electrode during a fuel cell performance recovery operation.

DETAILED DESCRIPTION OF THE PREFERRED EMBODIMENTS

First Embodiment

An embodiment of a fuel cell system provides a function to recover the performance of fuel cells that have deteriorated, particularly to recover the performance of deteriorated fuel electrode catalyst layers. Preferably, the fuel cell system includes a stack of polymer electrolyte fuel cells.

Figure 1:
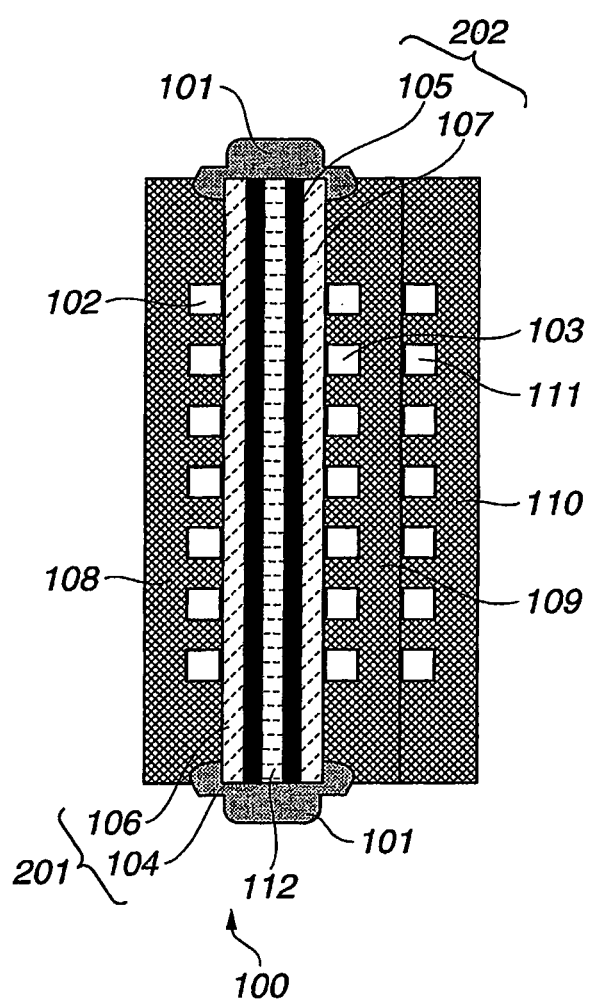
FIG. 1 is a sectional view of a power generator unit (viz., cell unit) used in a preferred embodiment of a fuel cell system of the present invention.

As shown in FIG. 1, an individual fuel cell provides a power generator unit 100. Preferably, power generator unit 100 (also called a "cell unit") includes a polymer electrolyte membrane 112, a fuel electrode 201 (also called a "fuel gas diffusion electrode"), an oxidizing electrode 202 (also called an "oxidizing gas diffusion electrode"), a fuel gas separator 108, an oxidizing gas separator 109, and a refrigerant separator 110. The separators may also be referred to respectively as "separator plates."

As shown in FIG. 1, fuel electrode 201 and oxidizing electrode 202 are arranged on opposite sides or surfaces of polymer electrolyte membrane 112. That is, polymer electrolyte membrane 112 is sandwiched between fuel electrode 201 and oxidizing electrode 202.

Fuel electrode 201 preferably includes a fuel electrode catalyst layer 104 and a fuel gas diffusion layer 106. Oxidizing electrode 202 preferably includes an oxidizing electrode catalyst layer 105 and an oxidizing gas diffusion layer 107. Fuel gas separator 108 is disposed at the side of fuel electrode 201, and oxidizing gas separator 109 is disposed at the side of oxidizing electrode 202. Preferably, refrigerant separator 110 is disposed on the side of oxidizing electrode 202.

As shown, a stacked structure including polymer electrolyte membrane 112, fuel electrode 201, and oxidizing electrode 202 has both ends sealed with respective edge seals 101. Fuel gas separator 108 defines a fuel gas flow passage 102, and oxidizing gas separator 109 defines an oxidizing gas flow passage 103. Refrigerant separator 110 defines a refrigerant flow passage 111 such that refrigerant in refrigerant flow passage 111 flows in a direction parallel to a flow direction of oxidizing gas in oxidizing gas flow passage 103 (for example, in a direction perpendicular to the sheet).

Preferably, a fuel cell stack includes a stacked plurality of power generator units 100 as shown and described with respect to FIG. 1. In particular, for each of the power generator units 100, a fuel electrode, which includes catalyst and gas diffusion layers, and an oxidizing electrode, which also includes catalyst and gas diffusion layers, are respectively disposed on opposite sides of an electrolyte membrane.

The performance of such a fuel cell stack may deteriorate due to any of the following four conditions.

(1) A condition wherein the area of the outer surface of the fuel electrode catalyst is reduced by a predetermined degree. This condition can be detected by, for example, a cyclic voltammogram (also called a "current-potential curve").

(2) A condition wherein continuous operation of the fuel cell stack at a low load (i.e., operating at a reduced current density relative to normal operation) exceeds a predetermined time period. This condition can be detected by using, for example, a voltage sensor and a timer.

(3) A condition wherein a total amount of time (also called "integrated time") that the fuel cell stack is operated at a low load exceeds a predetermined amount of time. This condition can also be detected by using, for example, a voltage sensor and a timer.

(4) A condition wherein power generating performance of the fuel cell stack deteriorates at a predetermined rate. This condition can be detected, for example, by evaluating changes in a current-voltage characteristic of the fuel cell stack.

The area of the outer surface of the fuel electrode electrolyte, the load, the time and the power generating performance described in any of the above-mentioned conditions (1) to (4) may be used as criteria for determining whether or not it is appropriate to carry out a performance recovery operation on the fuel cell stack. Since the area of the outer surface of the fuel electrode electrolyte, the load, the time and the power generating performance may differ for individual cell units in a fuel cell stack, it is preferable to measure them in advance. Thus, the criteria for determining whether or not it is appropriate to carry out a performance recovery operation for a specific fuel cell stack may be customized so as to avoid reduced power generation for that specific fuel cell stack.

Fuel cell gas piping systems 300 that provide performance recovery operations will now be described with reference to FIGS. 4 to 9. FIGS. 4 to 9 show alternate arrangements of gas piping systems that each generally include a fuel electrode circulation system (also called a "fuel gas supply system") and an oxidizing gas supply system that are connected to the fuel cell stack for generating electric power. A fuel cell stack generates electricity when fuel electrodes 201 and oxidizing electrodes 202 are supplied with fuel gas and oxidizing gas by the fuel electrode circulation system and the oxidizing gas supply system, respectively.

Figure 4:
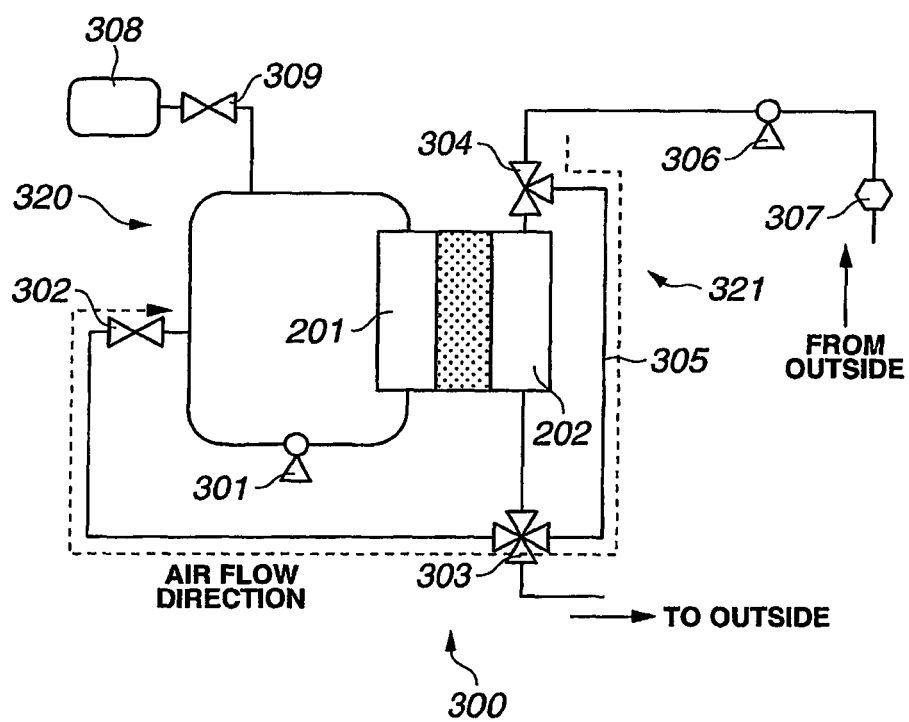
FIG. 4 is a schematic drawing illustrating a first embodiment of a gas system piping including a fuel cell performance recovery operation.

Referring to FIG. 4, fuel electrode 201 is connected to a fuel electrode circulation system 320, and oxidizing electrode 202 is connected to an oxidizing gas supply system 321. Fuel electrode circulation system 320 preferably includes a fuel gas circulating pump 301, a purge valve 302, a fuel gas supply valve 303, and a fuel gas supply source 308. Oxidizing gas supply system 321 preferably includes an oxidizing gas discharge valve 303, an oxidizing gas supply valve 304, an oxidizing gas bypass line 305, an oxidizing gas compressor 306, and a chemical filter 307. Oxidizing gas discharge valve 303 and fuel electrode circulation system 320 are connected through purge valve 302.

During a performance recovery operation, air from oxidizing gas supply system 321 is lead to fuel electrode circulation system 320 along an air flow path indicated by the dotted line in the direction of the arrow. Purge valve 302 is open and fuel gas circulation pump 301 is energized to cause air to flow in fuel electrode circulation system 320 in a counterclockwise direction in the drawing. Accordingly, the interior of fuel electrode circulation system 320 has a negative pressure, which draws oxidizing gas into fuel electrode circulation system 320 from oxidizing gas supply system 321 through purge valve 302, thereby providing a performance recovery operation of fuel electrode 201.

According to the performance recovery operation, hydrogen and oxygen can be effectively mixed in fuel electrode circulation system 320, thereby effectively producing water on the catalyst of the fuel electrode. Furthermore, contamination of the air that is drawn from oxidizing gas supply system 321 to fuel electrode circulation system 320 may be prevented by chemical filter 307, which reduces and preferably eliminates impurities in the air from the outside.

Figure 5:
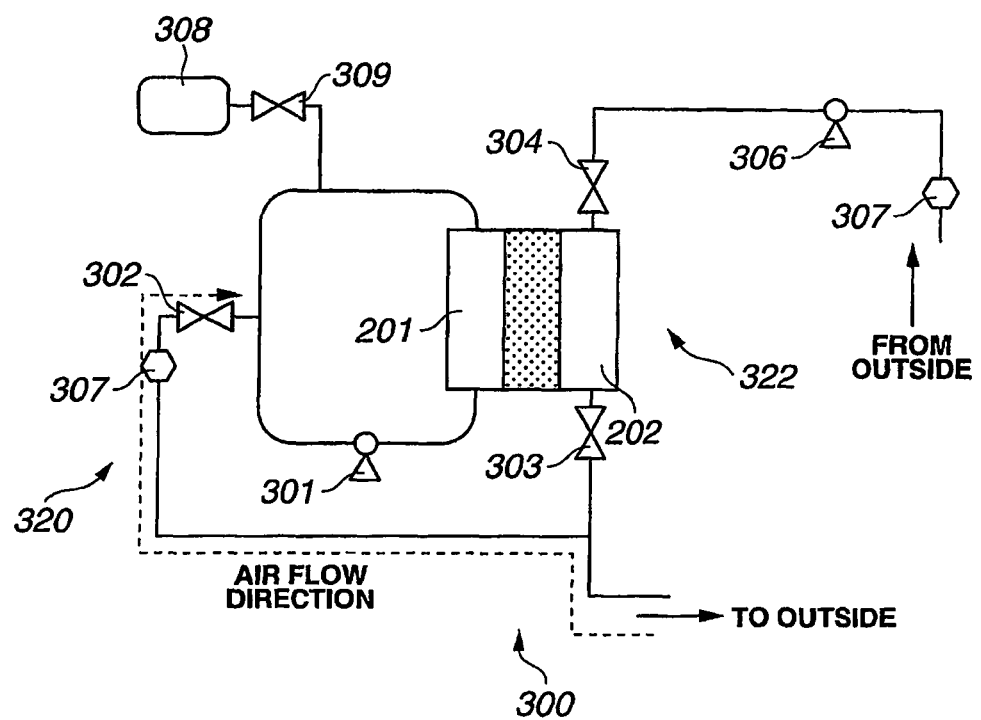
FIG. 5 is a schematic drawing illustrating a second embodiment of a gas system piping including a fuel cell performance, recovery operation.

Referring now to FIG. 5, a fuel electrode 201 is connected to a fuel electrode circulation system 320, and an oxidizing electrode 202 is connected to an oxidizing gas supply system 322. As compared to the embodiment of FIG. 4, a first chemical filter 307 is installed in a part of the piping in which air flows from oxidizing gas supply system 322 to fuel electrode circulation system 320. According to the embodiment illustrated in FIG. 5, an oxidizing gas supply system 322 preferably includes an oxidizing gas discharge valve 303, an oxidizing gas supply valve 304, an oxidizing gas compressor 306, and a second chemical filter 307. Oxidizing gas discharge valve 303 and fuel electrode circulation system 320 are connected through first chemical filter 307 and purge valve 302.

During a performance recovery operation, air from oxidizing gas supply system 322 is lead to fuel electrode circulation system 320, purge valve 302 is in an open condition, and fuel gas circulating pump 301 is operated so as to develop negative pressure in fuel electrode circulation system 320. Oxidizing gas (e.g., drawn from outside air) is drawn into fuel electrode circulation system 320 from oxidizing gas supply system 322 through purge valve 302 and first chemical filter 307 to effectively produce water for carrying out a performance recovery operation. Outside air can be introduced to fuel electrode circulation system 320 through chemical filter 307 along an air flow path indicated by the dotted line in the direction of the arrow. Accordingly, the exemplary embodiment shown in FIG. 5 may eliminate oxidizing gas bypass line 305 as shown in FIG. 4, and oxidizing gas discharge valve 303 and oxidizing gas supply valve 304 may be simplified as compared to the exemplary embodiment shown in FIG. 4.

Figure 6:
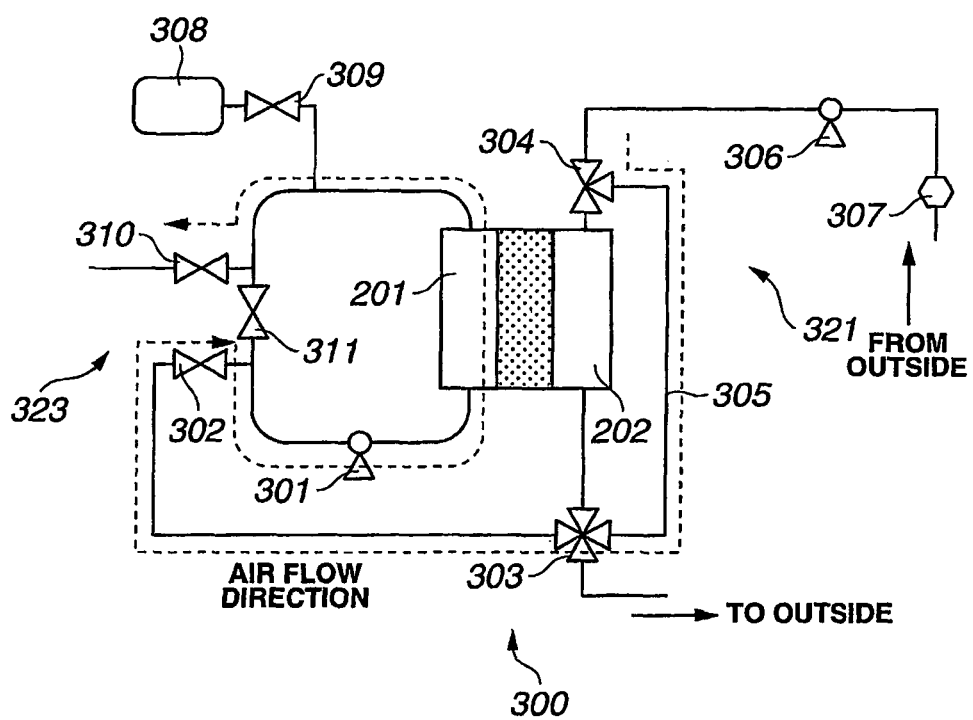
FIG. 6 is a schematic drawing illustrating a third embodiment of a gas system piping including a fuel cell performance recovery operation.

Referring now to FIG. 6, a fuel electrode 201 is connected to a fuel electrode circulation system 323, and an oxidizing electrode 202 is connected to an oxidizing gas supply system 321, similar to the exemplary embodiment shown in FIG. 4. Fuel electrode circulation system 323 preferably includes a fuel gas circulation pump 301, a first purge valve 302 (also called a "first valve"), a fuel gas supply valve 309, a fuel gas supply source 308, a second purge valve 310 (also called a "second valve"), and a circulation system electromagnetic valve 311 (also called a "third valve").

During a performance recovery operation, air from oxidizing gas supply system 321 is lead to fuel electrode circulation system 323, first and second purge valves 302, 310 are in an open condition, a line of fuel electrode circulation system 323 between first and second purge valves 302, 310 is kept closed by circulation system electromagnetic valve 311, and fuel gas circulating pump 301 is operated so as to develop negative pressure in fuel electrode circulation system 323. Oxidizing gas (e.g., drawn from outside air) may be rapidly drawn into fuel electrode circulation system 323, along an air flow path indicated by the dotted line, from oxidizing gas supply system 321 for carrying out a performance recovery operation. Concurrently, fuel gas in the fuel electrode circulation system 323 flows in a one-way direction indicated by the arrow of the dotted line to quickly dispose fuel electrode 201 in an air atmosphere.

Figure 7:
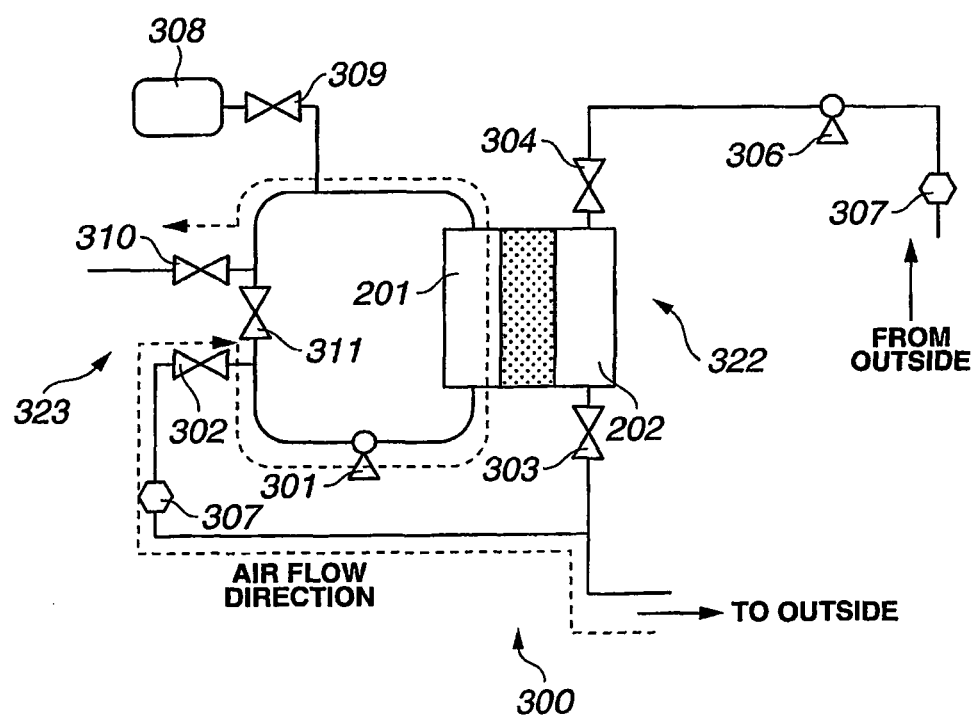
FIG. 7 is a schematic drawing illustrating a fourth embodiment of a gas system piping including a fuel cell performance recovery operation.

Referring now to FIG. 7, a fuel electrode 201 is connected to a fuel electrode circulation system 323 similar to the exemplary embodiment shown in FIG. 6, and an oxidizing electrode 202 is connected to an oxidizing gas supply system 322 similar to the exemplary embodiment shown in FIG. 5. Fuel electrode circulation system 323 preferably also includes a chemical filter 307 disposed between purge valve 302 and the oxidizing gas discharge system.

During a performance recovery operation, air from oxidizing gas supply system 322 is lead to fuel electrode circulation system 323, first and second purge valves 302, 310 are in an open condition, a line of fuel electrode circulation system 323 between first and second purge valves 302, 310 is kept closed by circulation system electromagnetic valve 311, and fuel gas circulating pump 301 is operated so as to develop negative pressure in fuel electrode circulation system 323. Oxidizing gas may be rapidly drawn into fuel electrode circulation system 323 from oxidizing gas supply system 322 for carrying out a performance recovery operation of fuel electrode 201. Accordingly, the exemplary embodiment shown in FIG. 7 may eliminate oxidizing gas bypass line 305 as shown in FIG. 6, and oxidizing gas discharge valve 303 and oxidizing gas supply valve 304 may be simplified as compared to the exemplary embodiment shown in FIG. 6.

Figure 8:
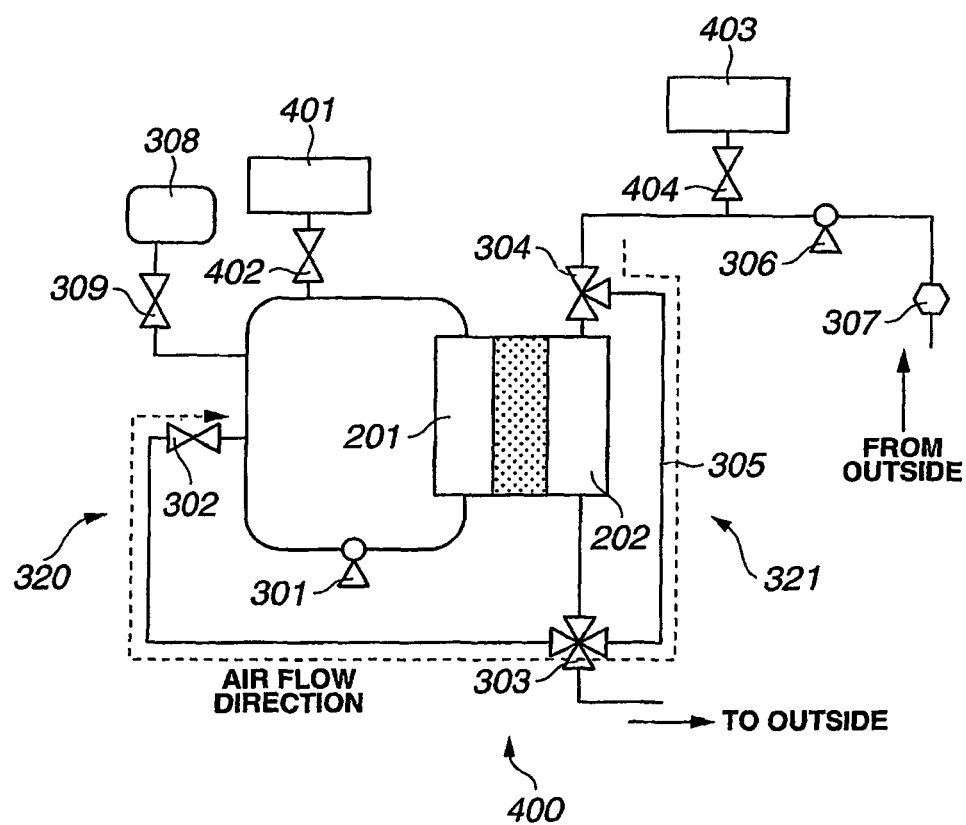
FIG. 8 is a schematic drawing illustrating a fifth embodiment of a gas system piping including a fuel cell performance recovery operation.

Referring now to FIG. 8, a fuel electrode 201 is connected to a fuel electrode circulation system 320 similar to the exemplary embodiment shown in FIG. 4, and an oxidizing electrode 202 is connected to an oxidizing gas supply system 321 that is also similar to the exemplary embodiment shown in FIG. 4. In addition, a fuel electrode humidifier 401 (also called a "first water supplier") is connected through an electromagnetic valve 402 to fuel electrode circulation system 320, and an oxidizing electrode humidifier 403 (also called a "second water supplier") is connected through an electromagnetic valve 404 to oxidizing gas supply system 321. The fuel electrode and oxidizing electrode humidifiers 401, 403 are preferably controlled so as to increase humidity relative to normal operation.

During a performance recovery operation, water or humidified gas from fuel electrode humidifier 401 may be supplied to fuel electrode 201 via fuel electrode circulation system 320 by opening electromagnetic valve 402. Similarly, water or humidified gas from fuel electrode humidifier 403 may be supplied to oxidizing electrode 202 via oxidizing gas circulation system 321 by opening electromagnetic valve 404. Accordingly, water or humidified gas may be supplied to either or both of fuel electrode 201 and oxidizing electrode 202, such that the highly humidified condition enhances a performance recovery operation of fuel electrode 201.

Figure 9:
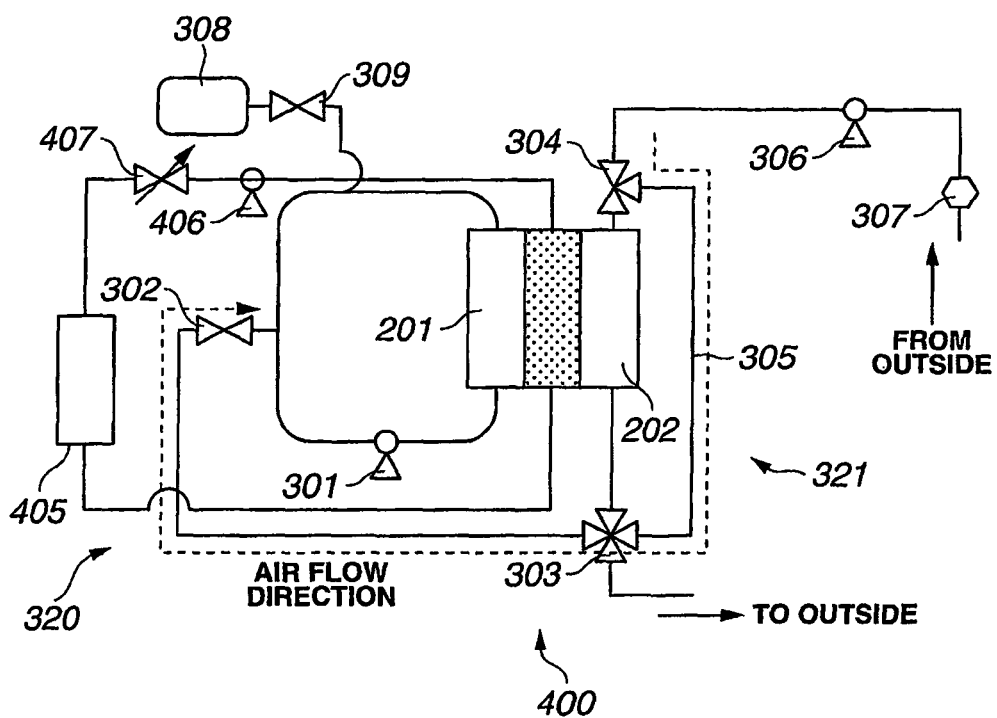
FIG. 9 is a schematic drawing illustrating a sixth embodiment of a gas system piping including a fuel cell performance recovery operation.

Referring now to FIG. 9, a fuel electrode 201 is connected to a fuel electrode circulation system 320 similar to the exemplary embodiment shown in FIG. 4, and an oxidizing electrode 202 is connected to an oxidizing gas supply system 321 that is also similar to the exemplary embodiment shown in FIG. 4. Furthermore, the fuel cell is connected to a radiator 405, a refrigerant circulating pump 406, and a refrigerant flow meter 407. Preferably, the refrigerant circulating pump is controlled so as to lower the fuel cell temperature relative to normal operation.

During a performance recovery operation, refrigerant circulating pump 406 circulates refrigerant to cool the fuel cell. Lowering the temperature of the fuel cell tends to increase the relative humidify in the fuel cell, which may enhance a performance recovery operation as was discussed above with respect to the exemplary embodiment shown in FIG. 8.

Figure 10:
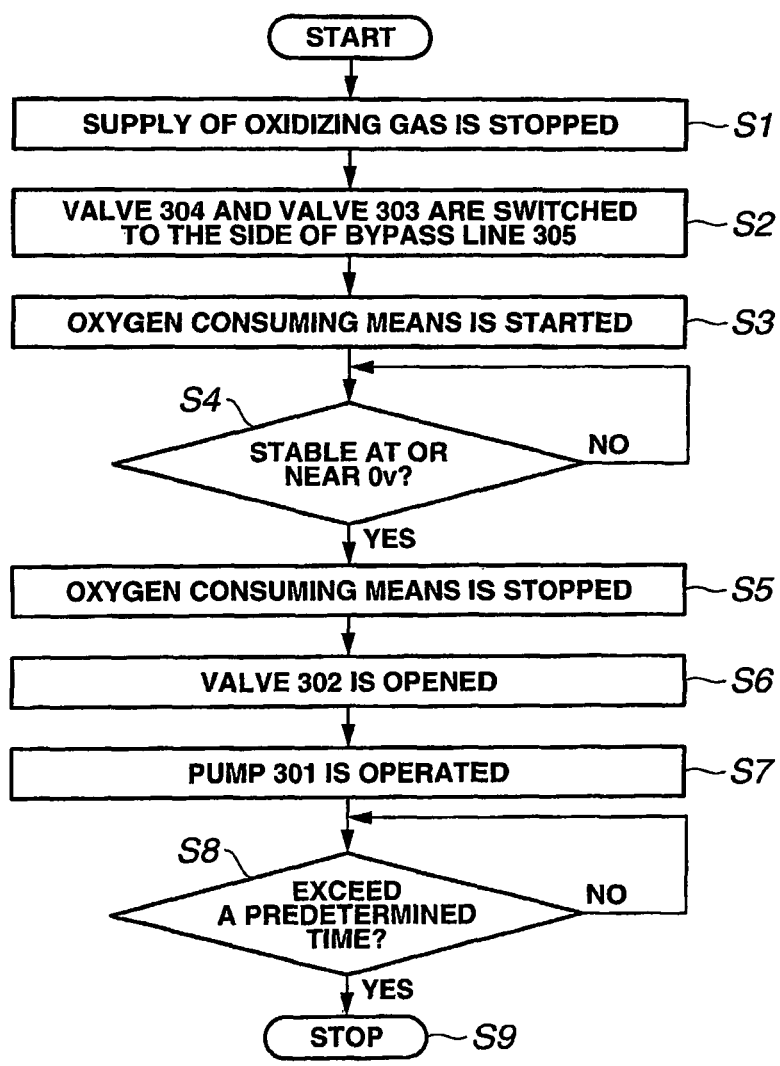
FIG. 10 is a flowchart illustrating a first embodiment of a fuel cell performance recovery operation.

With reference to FIGS. 4 and 10, an embodiment of a performance recovery operation will now be described.

The flowchart of FIG. 10 depicts operation steps S1 to S9. At step S1, the supply of oxidizing gas from the outside to oxidizing gas circulation system 321 of FIG. 4 is stopped. At step S2, oxidizing gas supply valve 304 and oxidizing gas discharge valve 303 are switched from a first arrangement feeding oxidizing gas to oxidizing electrode 202 to a second arrangement feeding oxidizing gas through bypass line 305, and thus feeding of oxidizing gas to oxidizing electrode 202 is stopped and bypassed.

At step S3, because the fuel cell consumes oxygen, both electrodes are put into a hydrogen atmosphere. Oxygen is consumed when electricity is produced or when both electrodes are electrically shorted. When the volume of fuel electrode circulation system 320 is smaller than that of oxidizing gas supply system 321, circulation of fuel gas to fuel electrode 201 prevents both of the electrodes from being put into an oxygen atmosphere.

At step S4, a check is carried out as to whether or not the voltage is stable at or near the value zero volts. If the voltage is stable, the oxygen consumption is stopped at step S5.

Then, at step S6, purge valve 302 is opened and, at step S7, fuel gas circulating pump 301 is operated to develop negative pressure in fuel electrode circulation system 320. As it is used herein, "negative pressure" in the fuel electrode circulation system refers to a lower pressure relative to atmospheric pressure outside the fuel electrode circulation system (e.g., upstream from purge valve 302). Accordingly, negative pressure in fuel electrode circulation system 320 draws air from the outside through chemical filter 307, thereby disposing fuel electrode 201 in an air atmosphere while reacting with remaining hydrogen to produce water such that fuel electrode 201 has a higher potential level (for example, approximately 1.9 volts).

At step S8, the higher potential is maintained for a time period that is determined based on the potential level of the fuel electrode 201, the moisture content in the fuel cell, and the temperature of the fuel cell. And then, at step S9, at the end of a predetermined time, the performance recovery operation is stopped. The predetermined time is determined based on a cyclic voltammogram (also called a "current-potential curve"), which is deemed as a time for which desorption of impurities is achieved. For example, when the potential level of fuel electrode 201 is maintained at 1.0 volts/cell (V/cell), the predetermined time occurs when a value of current density (e.g., measured in milliamperes per square centimeter ($mA/cm^2$)) with a voltage higher than 1.0 volt (vs. RHE) is reduced to a predetermined value. If, for example, the cell temperature is 80° Celsius and the relative humidity is 100%, the predetermined time may be approximately 120 seconds.

Preferably, stopping the performance recovery operation occurs when certain conditions are all satisfied. Specifically, the performance recovery operation may be stopped when: (1) fuel gas circulating pump 301 and oxidizing gas compressor 306 (as shown in FIGS. 4 to 9) and refrigerant circulating pump 406 (shown in FIG. 9) are all stopped; (2) purge valve 302 and fuel gas supply valve 309 (shown in FIGS. 4 to 9), the second purge valve 310 (shown in FIG. 6), and electromagnetic valves 402 and 404 (shown in FIG. 8) are all closed; and (3) oxidizing gas discharge valve 303 and oxidizing gas supply valve 304 are in a condition to seal (e.g., bypass) oxidizing electrode 202.

Similarly, the conditions for stopping the performance recovery operation in step S9 of FIG. 10 may also apply to step S22 of FIG. 11 (as with regard to a second embodiment to be described hereinafter), step S30 of FIG. 12 (as with regard to a third embodiment to be described hereinafter), step S43 of FIG. 13 (as with regard to a fourth embodiment to be described hereinafter), and step S58 of FIG. 14 (as with regard to a fifth embodiment to be described hereinafter).

FIG. 2(A) schematically shows changes in state of both fuel electrode 201 and oxidizing electrode 202 during the performance recovering operation process 200 depicted in FIG. 10. In the first panel of FIG. 2(A), a load 203 (for example, a resistive element) initially provides the impetus for the above-mentioned oxygen consumption. Then, in the second panel, when the load 203 has electrically shorted fuel electrode 201 and oxidizing electrode 202, both fuel electrode 201 and oxidizing electrode 202 are stopped in a hydrogen atmosphere. In the third panel, oxidizing gas (e.g., air) supplied to fuel electrode 201 reacts with hydrogen remained in fuel electrode 201, such that fuel electrode 201 is put into an air atmosphere (fourth panel of FIG. 2(A)) and water is produced.

According to this performance recovering operation, oxidizing gas (e.g., air) is supplied to fuel electrode 201 when both fuel electrode 201 and oxidizing electrode 202 are disposed in a hydrogen atmosphere. Thus, in contrast to when the fuel cell is generating electrical power, fuel electrode 201 is disposed in an air atmosphere and oxidizing electrode 202 is disposed in a hydrogen atmosphere, which suppresses deterioration of oxidizing electrode 202. Furthermore, hydrogen and oxygen are well mixed in fuel electrode 201, thereby effectively producing water on the catalyst layer of fuel electrode 201 such that adsorbates can be effectively removed (e.g., by flushing with the water).

Introducing air to fuel electrode 201 during the performance recovery operation may be carried out by starting oxidizing gas compressor 306 to draw compressed air to fuel electrode circulation system 320. According to the performance recovery operation, the effective area of the outer surface of the catalyst layer of fuel electrode 201 is restored, and power generating performance of the fuel cell is recovered.

The method of supplying the oxidizing gas to fuel electrode 201 is not limited to the performance recovery operation in accordance with the exemplary embodiment described with respect to the system illustrated in FIG. 4. A first alternate performance recovery operation with respect to the system illustrated in FIG. 5, a second alternate performance recovery operation with respect to the system illustrated in FIG. 6, and a third alternate performance recovery operation with respect to the system illustrated in FIG. 7, are also envisioned and will now be described.

First Alternate Performance Recovery Operation

As shown in FIG. 5, a chemical filter 307 is arranged in a fuel gas purge line at a position upstream, with respect to the air flow direction, of a purge valve 302, and thus air introduced during the performance recovery operation from the oxidizing gas discharge system to fuel electrode circulation system 320 passes through first chemical filter 307. Accordingly, as compared to the embodiment illustrated in FIG. 4, the oxidizing gas bypass line 305 may be eliminated, and oxidizing gas discharge valve 303 and oxidizing gas supply valve 304 may be simplified. Furthermore, air for fuel electrode 201 can be readily supplied from the outside directly through the fuel gas purge line with first chemical filter 307.

Second Alternate Performance Recovery Operation

As shown in FIG. 6, by opening first and second purge valves 302, 310 and closing electromagnetic valve 311, unidirectional flow in fuel electrode circulation system 323 is caused to occur along the dotted line in the direction of air flow shown by the arrow. Air is supplied from oxidizing gas supply system 321 to fuel electrode 201 when one or both of fuel gas circulating pump 301 and oxidizing gas compressor 306 are operated. Thus, air drawn from oxidizing gas supply system 321, which is generally the same as was described with respect to the embodiment illustrated in FIG. 4, may be rapidly supplied so as to shorten the time required to dispose fuel electrode 201 in an air atmosphere, and to thereby shorten the time required for the performance recovery operation.

Third Alternate Performance Recovery Operation

As shown in FIG. 7, unidirectional flow in fuel electrode circulation system 323 is caused to occur in generally the same manner as described above with respect to FIG. 6. However, when fuel gas circulating pump 301 is operated, air is introduced from oxidizing gas discharge system 322 to fuel electrode 201 in generally the same manner as was described above with respect to FIG. 5. Accordingly, air for fuel electrode 201 can be readily supplied from the outside directly through the fuel gas purge line with first chemical filter 307, and thus fuel electrode 201 can be quickly disposed in an air atmosphere, thereby shortening the time required for the performance recovery operation.

In addition to the aforementioned first, second, and third alternate performance recovery operations, two additional alternate performance recovery operations will now be described with respect to FIGS. 8 and 9.

Fourth Alternate Performance Recovery Operation

As shown in FIG. 8, opening electromagnetic valve 402 causes one or both of fuel and oxidizing electrodes 201, 202, (preferably, the fuel electrode 201) to be supplied via fuel electrode circulation system 320 with water or humidified gas from fuel electrode humidifier 401. Similarly, opening electromagnetic valve 404 causes one or both of fuel and oxidizing electrodes 201, 202, (preferably, the oxidizing electrode 202) to be supplied via oxidizing gas circulation system 321 with water or humidified gas from oxidizing electrode humidifier 403.

Supplying water or humidified gas to one or both of fuel and oxidizing electrodes 201, 202 may facilitate and enhance the performance recovery operation by keeping the interior of the fuel cell in a highly humidified condition. Humidity (or water) for fuel and oxidizing electrodes 201, 202 may be supplied by fuel electrode humidifier 401 and electromagnetic valve 402, and/or may be supplied by oxidizing electrode humidifier 403 and electromagnetic valve 404. Improved effectiveness of the performance recovery operation may be obtained when the moisture content in the catalyst layer of fuel electrode 201 has been increased so as to increase the reaction and the discharge effect in the fuel cell.

Fifth Alternate Performance Recovery Operation

As shown in FIG. 9, circulating refrigerant by operating refrigerant circulating pump 406 may cool the fuel cell stack, and thus cool the fuel cells. By lowering the temperature of a fuel cell by lowering the temperature of the fuel cell stack, relative humidity in the fuel cell may be increased, thereby improving the effectiveness of the performance recovery operation in generally the same manner as described above with respect to FIG. 8. Radiator 405, refrigerant circulating pump 406, and refrigerant flow meter 407 may provide cooling for the fuel cell stack. Accordingly, lowering the temperature of the fuel cell stack increases the relative humidity of fuel electrode 201, and may thereby facilitate and enhance the performance recovery operation.

Second Embodiment

A second embodiment of a fuel cell system will now be described with reference to the exemplary embodiment of the gas piping system illustrated in FIG. 4 and the method depicted in FIG. 11.

Figure 11:
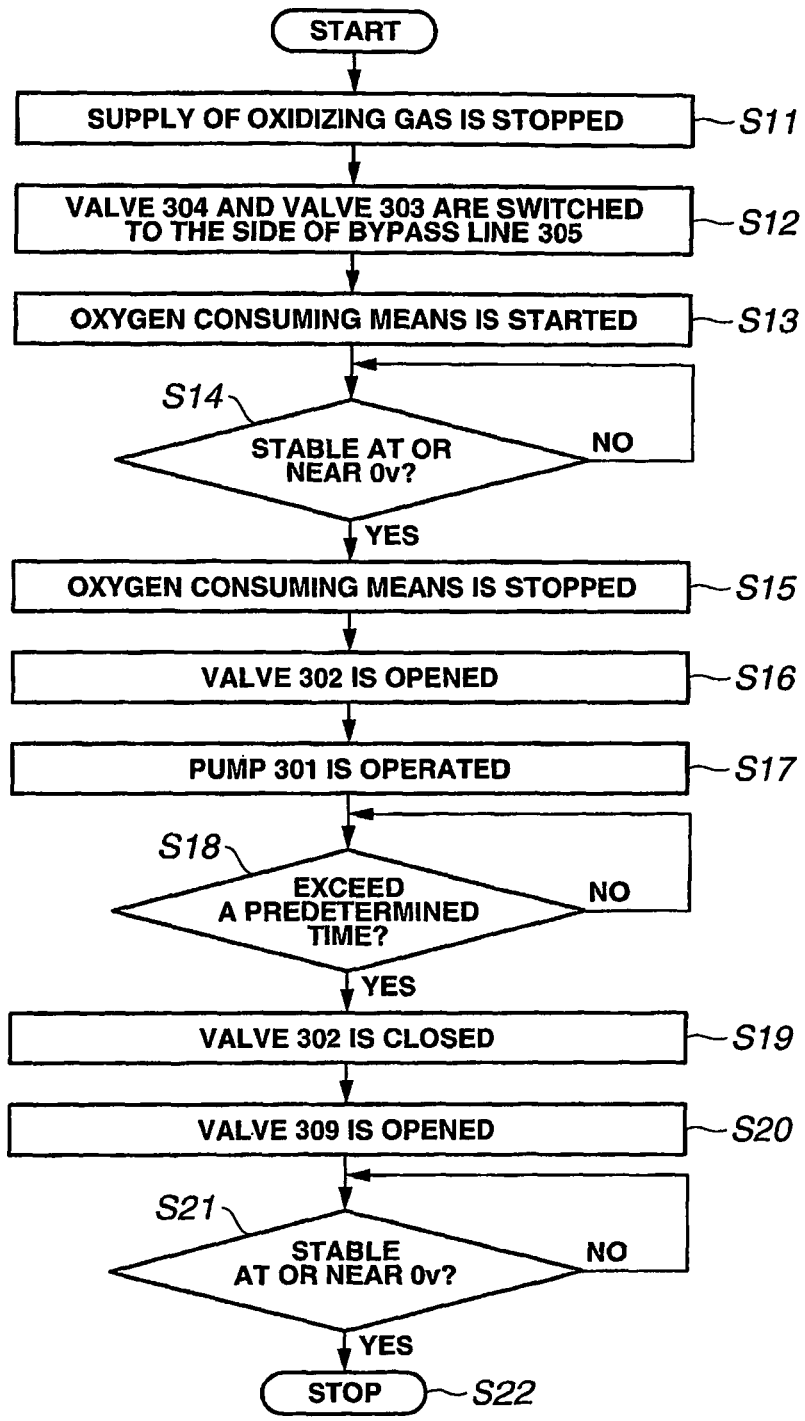
FIG. 11 is a flowchart illustrating a second embodiment of a fuel cell performance recovery, operation.

The flowchart shown in FIG. 11 includes operation steps S11 to S22. Generally, operation steps S11 to S18 correspond to operation steps S1 to S8 shown in FIG. 10, and therefore an explanation thereof will not be repeated. As in the first embodiment, air is introduced to fuel electrode 201 and fuel electrode 201 is kept at a higher potential for a predetermined time.

At step S19 of FIG. 11, fuel gas purge valve 302 of FIG. 4 is closed. At step S20, fuel gas supply valve 309 is opened to supply fuel gas (e.g., hydrogen) from fuel gas supply source 308 to fuel electrode 201, thereby producing water by reacting with oxygen that remains in fuel electrode 201. At step S21, a check is carried out as to whether or not the fuel cell voltage is stable at or near zero volts. If the voltage is stable, the performance recovery operation is stopped at step S22.

According to the second embodiment, the amount of water produced on the catalyst layer of fuel electrode 201 is much greater, the moisture content in the catalyst layer of fuel electrode 201 is therefore increased, and the effectiveness of the performance recovery operation increases. Further, since both fuel and oxidizing electrodes 201, 202 can be stopped in a hydrogen atmosphere, deterioration of the catalyst layer of oxidizing electrode 202 can be suppressed. Otherwise, deterioration may occur when both fuel and oxidizing electrodes 201, 202 are disposed in an air atmosphere and, at the next time the fuel cell is started, hydrogen is supplied to fuel electrode 201.

FIG. 2(B) schematically shows changes in state of both fuel electrode 201 and oxidizing electrode 202 during the performance recovering operation process 200 depicted in FIG. 11. The first three panels of FIG. 2(B) are generally the same as FIG. 2(A) and their description will not be repeated. As shown in the fourth panel of FIG. 2(B), fuel electrode 201 is disposed in an air atmosphere and oxidizing electrode 202 is disposed in a hydrogen atmosphere. Thereafter, as shown in the fifth panel, fuel electrode 201 is supplied with hydrogen, which induces a reaction with the oxygen remaining in the fuel electrode 201 to produce water. Accordingly, the states of both fuel and oxidizing electrodes 201, 202 can be switched to avoid deterioration of the fuel cell, and various adsorbates can be effectively removed. Further, since the performance recovery operation is stopped with both fuel and oxidizing electrodes 201, 202 disposed in a hydrogen atmosphere, deterioration that may affect a subsequent power generation is avoided.

Third Embodiment

A third embodiment of a fuel cell system will now be described with reference to the exemplary embodiment of the gas piping system illustrated in FIG. 4 and the method depicted in FIG. 12.

Figure 12:
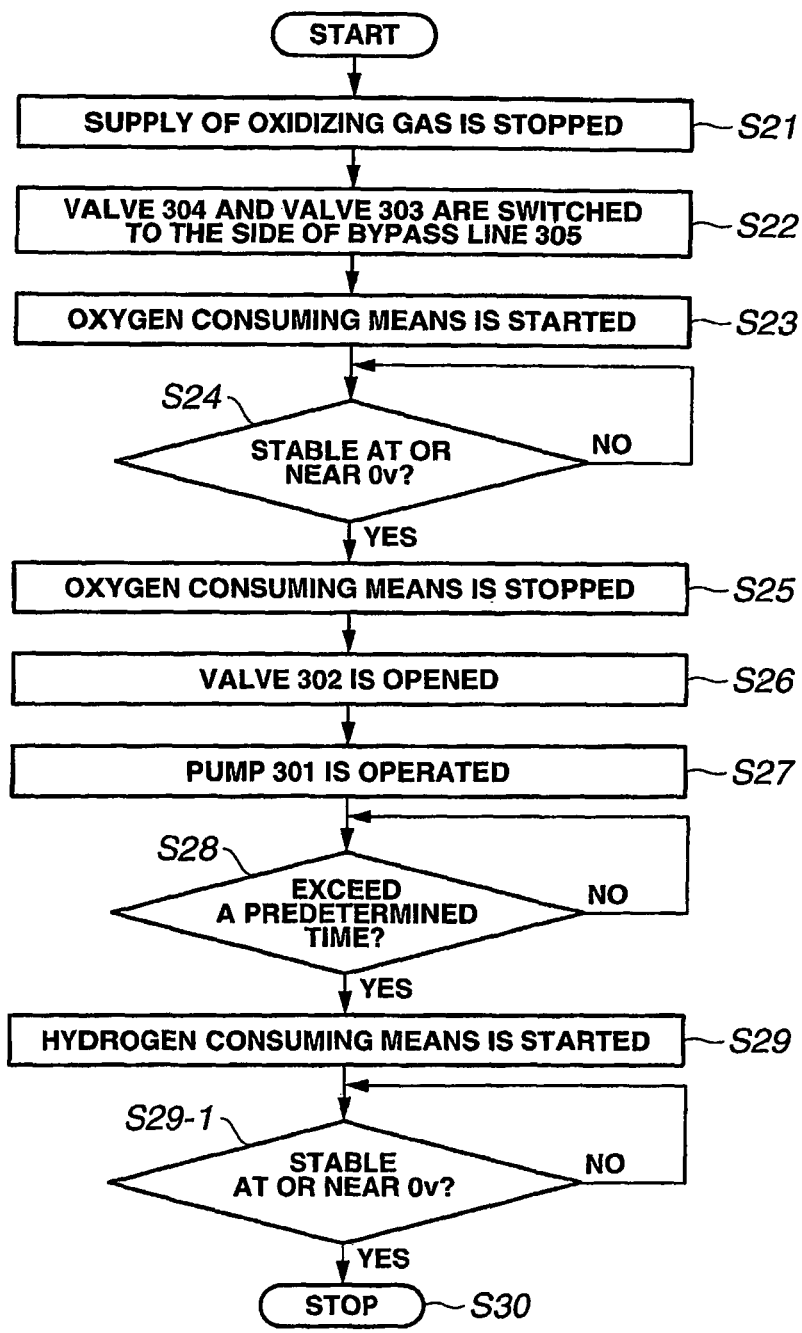
FIG. 12 is a flowchart illustrating a third embodiment of a fuel cell performance recovery operation.

The flowchart shown in FIG. 12 includes operation steps S21 to S30. Generally, operation steps S21 to S28 correspond to operation steps S1 to S8 shown in FIG. 10, and an explanation thereof will not be repeated. Again, as in the first embodiment, air is introduced to fuel electrode 201 and fuel electrode 201 is kept at a higher potential for a predetermined time.

At step S29 of FIG. 12, hydrogen is consumed in the fuel cell and air is supplied to fuel electrode 201. Then, both fuel and oxidizing electrodes 201, 202 are stopped in air atmosphere. Hydrogen is consumed when electricity is produced or when both electrodes are electrically shorted. A reaction with the hydrogen remaining in oxidizing electrode 202 may produce water on the catalyst layer of the fuel electrode 201, and thus the effectiveness of the performance recovery operation may be improved in generally the same manner as described above with respect to FIG. 2(A).

At step S29-1, a check is carried out as to whether or not the fuel cell voltage is stable at or near zero volts. If the voltage is stable, the performance recovery operation is stopped at step S30.

According to the third embodiment, water that is produced on the catalyst layer of fuel electrode 201 may facilitate and enhance the recovery of electrical power generating performance. Further, since both fuel and oxidizing electrodes 201, 202 can be stopped in an oxygen atmosphere, deterioration of the fuel cell can be suppressed. Otherwise, deterioration may occur as a result of hydrogen mixing with air that is to be supplied to the fuel cell but that is held for a long time pending operation of the fuel cell.

FIG. 2(C) schematically shows changes in state of both fuel electrode 201 and oxidizing electrode 202 during the performance recovering operation process 200 depicted in FIG. 12. The first three panels of FIG. 2(C) are generally the same as FIG. 2(A) and their description will not be repeated. As shown in the fourth panel of FIG. 2(C), fuel electrode 201 is disposed in an air atmosphere and oxidizing electrode 202 is disposed in a hydrogen atmosphere. Thereafter, as shown in the fifth panel, an electric short circuit, e.g., applied by load 203, provides the impetus for the above-mentioned hydrogen consumption. Specifically, by applying the load 203 while fuel electrode 201 is disposed in an air atmosphere and oxidizing electrode 202 is disposed in a hydrogen atmosphere, the hydrogen remained in oxidizing electrode 202 is consumed and both fuel and oxidizing electrodes 201, 202 are stopped while disposed in an air atmosphere. Accordingly, the state of fuel electrode 201 and the state of oxidizing electrode 202 of the fuel cell may be changed so as to avoid deterioration of the fuel cell.

Furthermore, the hydrogen remaining in fuel electrode 201 reacts at the catalyst layer of fuel electrode 201, and water is produced such that various adsorbates can be effectively removed. Moreover, since the performance recovery operation is stopped with both electrodes disposed in an air atmosphere, deterioration that would be induced by holding the fuel cell inoperative for a long time may be avoided.

Fourth Embodiment

A fourth embodiment of a fuel cell system will now be described with reference to the exemplary embodiment of the gas piping system illustrated in FIG. 4 and the method depicted in FIG. 13.

Figure 13:
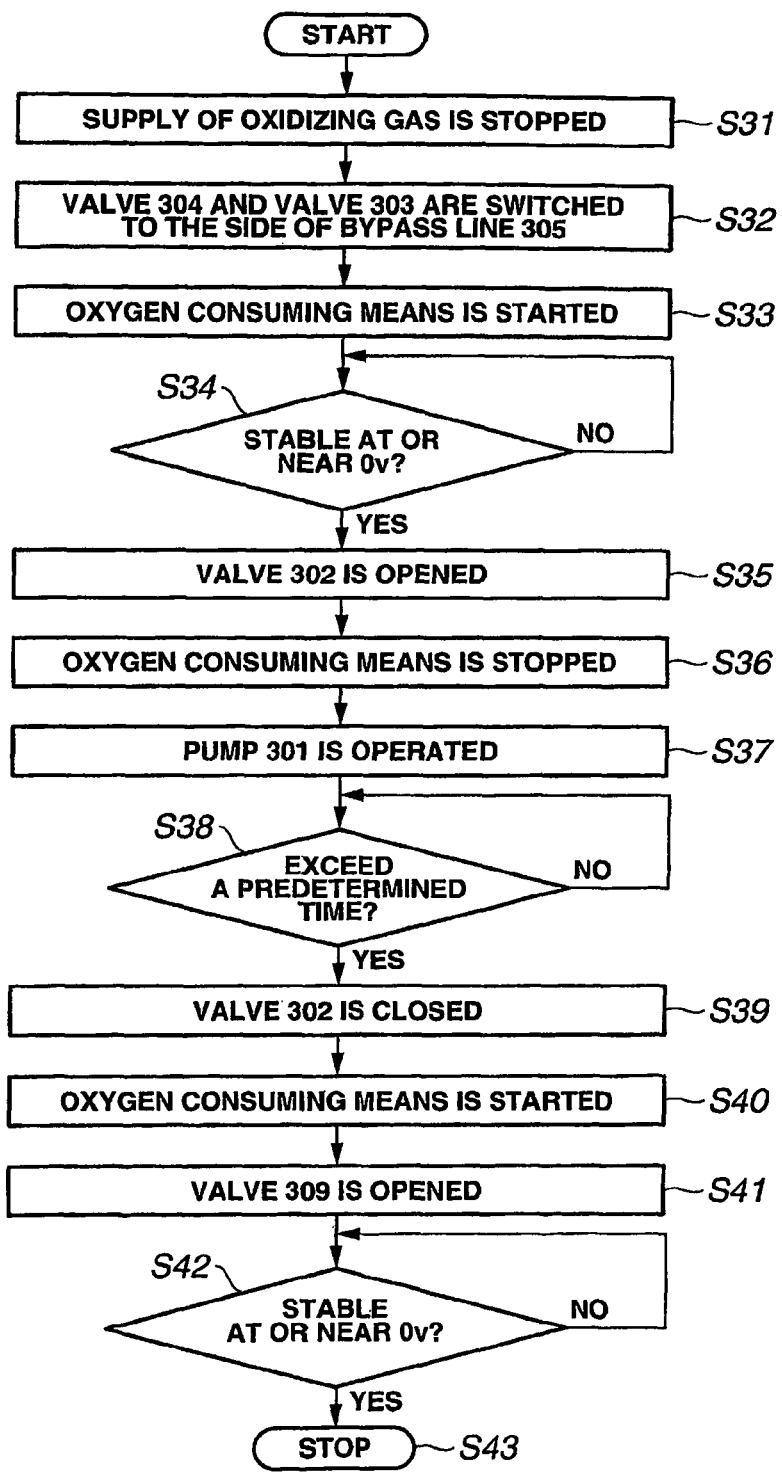
FIG. 13 is a flowchart illustrating a fourth embodiment of a fuel cell performance recovery operation.

The flowchart shown in FIG. 13 includes operation steps S31 to S43. Generally, operation steps S31 to 38 correspond to operation steps S1 to S8 shown in FIG. 10, and therefore an explanation thereof will not be repeated. Again, as in the first embodiment, air is introduced to fuel electrode 201 and fuel electrode 201 is kept at a higher potential for a predetermined time.

At step S39 of FIG. 13, fuel gas purge valve 302 of FIG. 4 is closed to stop circulation of air at fuel electrode 201. At step S40, while air circulation at fuel electrode 201 remains stopped, oxygen is consumed when electricity is produced or when both electrodes are electrically shorted. Thus, hydrogen remaining in oxidizing electrode 202 may be used to produce water on the catalyst layer of fuel electrode 201. At step S41, with the water being produced, fuel gas supply valve 309 is opened to supply fuel gas, e.g., hydrogen, to fuel electrode 201 such that both fuel and oxidizing electrodes 201, 202 are disposed in a hydrogen atmosphere. Thus, electrically shorting fuel and oxidizing electrodes 201, 202 with load 203 consumes the remaining oxygen at fuel electrode 201.

Then, at step S42, a check is carried out as to whether or not the fuel cell voltage is stable at or near zero volts. If the voltage is stable, the performance recovery operation is stopped at step S43. It may not be necessary to supply fuel gas if the performance recovery operation can be stopped with the fuel and oxidizing electrodes disposed in a hydrogen atmosphere.

According to the fourth embodiment, water produced on the catalyst layer of fuel electrode 201 may facilitate and enhance effective recovery of the electrical power generating performance of the fuel cell. Further, deterioration of the catalyst layer of oxidizing electrode 202, which is induced by subsequently starting the fuel cell, may be avoided by stopping the performance recovering operation with both fuel and oxidizing electrodes 201, 202 disposed in a hydrogen atmosphere.

FIG. 3(A) schematically shows changes in state of both fuel electrode 201 and oxidizing electrode 202 during the performance recovering operation process 200 depicted in FIG. 13. The first three panels of FIG. 3(A) are generally the same as FIG. 2(A) and their description will not be repeated. As shown in the fourth panel of FIG. 3(A), after stopping the air supply to fuel electrode 201, load 203 is applied to consume oxygen remaining in fuel electrode 201. Thereafter, as shown in the fifth panel, both fuel and oxidizing electrodes 201, 202 are stopped in a hydrogen atmosphere. Accordingly, the states of both fuel and oxidizing electrodes 201, 202 can be switched to avoid deterioration of the fuel cell, and water is produced such that various adsorbates can be effectively removed. Further, since the performance recovery operation is stopped with both fuel and oxidizing electrodes 201, 202 disposed in a hydrogen atmosphere, deterioration that may affect a subsequent power generation is avoided.

Fifth Embodiment

A fifth embodiment of a fuel cell system will now be described with reference to the exemplary embodiment of the gas piping system illustrated in FIG. 4 and the method depicted in FIG. 14.

Figure 14:
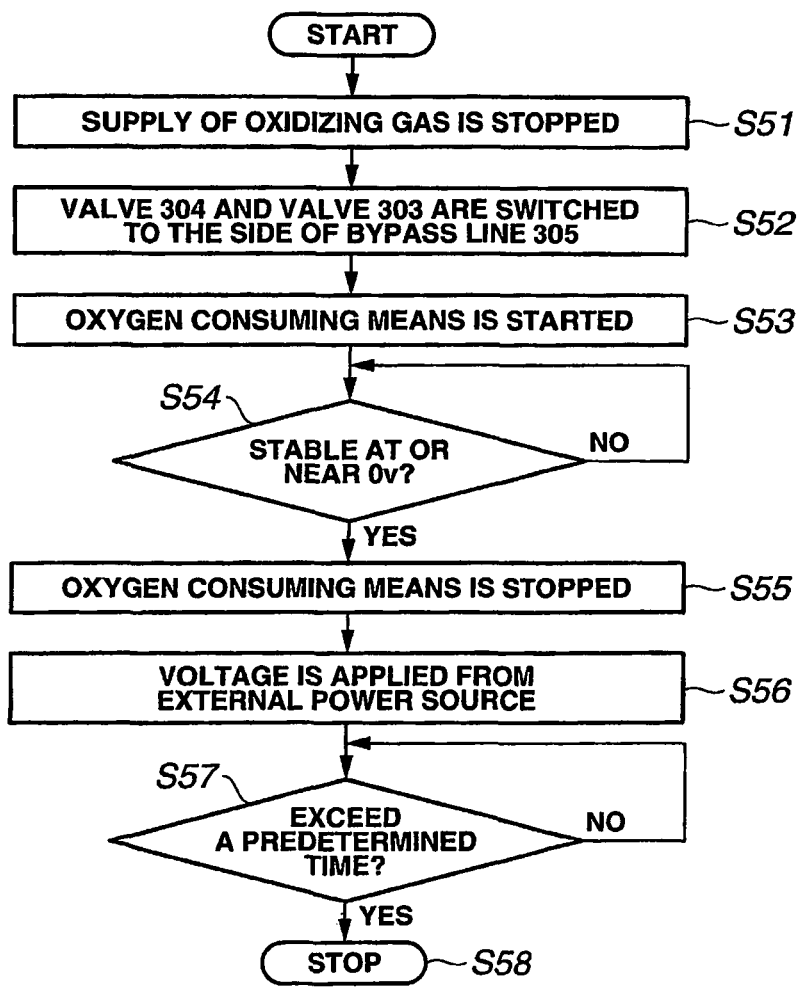
FIG. 14 is a flowchart illustrating a fifth embodiment of a fuel cell performance recovery operation.

The flowchart shown in FIG. 14 includes operation steps S51 to S58. Generally, operation steps S51 to S55 correspond to operation steps S1 to S5 shown in FIG. 10, and therefore an explanation thereof will not be repeated. Again, as in the first embodiment, air is introduced to fuel electrode 201 and fuel electrode 201 is kept at a higher potential for a predetermined time.

At step S56, with oxidizing electrode 202 disposed in a hydrogen atmosphere, an external power source is applied between fuel and oxidizing electrodes 201, 202 such that fuel electrode 201 is at a higher potential level for a predetermined time. Then at step S57, a determination is made as to whether or not the higher potential level has been maintained for at least a predetermined time. If so, the performance recovery operation is stopped at step S58.

As compared to the second through fourth embodiments, the fifth embodiment maintains fuel electrode 201 at the higher potential level by using an external power source to induce generally the same effect as when fuel electrode 201 is disposed in an air atmosphere. Any of the methods of introducing air to fuel electrode 201 and of stopping the air introduction, such as those described with respect to the first through fourth embodiments, may be implemented in the fifth embodiment.

According to the fifth embodiment, since the potential of fuel electrode 201 is controlled by the external power source while oxidizing electrode 202 is disposed in a hydrogen atmosphere, the potential level of fuel electrode 201 can be accurately held at a desired value, thereby increasing the precision of the performance recovery operation of the fuel cell. Further, the performance recovery operation may be simplified inasmuch as the recovery operation may be conducted regardless of whether fuel electrode 201 is disposed in a hydrogen atmosphere or in an air atmosphere.

FIG. 3(B) schematically shows changes in state of both fuel electrode 201 and oxidizing electrode 202 during the performance recovering operation process 200 depicted in FIG. 14. The first two panels of FIG. 3(B) are generally the same as FIG. 2(A) and their description will not be repeated. As shown in the third panel of FIG. 3(BA), with oxidizing electrode 202 disposed in a hydrogen atmosphere, an external power source 204 maintains the potential of fuel electrode 201 at 10 to 12 volts for a predetermined time. Accordingly, oxidizing electrode 202 may be disposed in a hydrogen atmosphere and external power source 204 can precisely control the potential level of fuel electrode 201. Further, the performance recovery operation may be conducted regardless of whether fuel electrode 201 is disposed in a hydrogen atmosphere or in an air atmosphere, thereby simplifying the performance recovery operation.

Embodiments according to the present invention provide various features and advantages. Examples of such features and advantages will now be described.

When the fuel cell starts or stops the power generation, the fuel electrode and oxidizing electrode may be disposed in a hydrogen atmosphere and then the fuel electrode may be maintained at a higher potential level. Accordingly, oxidization of adsorbates is accelerated, and thus, the adsorbates on the catalyst can be effectively removed.

When both the fuel electrode and oxidizing electrode are disposed in a hydrogen atmosphere, an oxidizing gas may be supplied to dispose the fuel electrode in an air atmosphere. Accordingly, water is produced on the catalyst layer of the fuel electrode. The water functions to oxidize adsorbates on the catalyst, and the adsorbates thus oxidized can be discharged by the oxidizing gas. Further, deterioration of the catalyst layer of the oxidizing electrode may be avoided when the oxidizing electrode is disposed in a hydrogen atmosphere. Thus, when the fuel cell system is included on a moving body, such as a motor vehicle or the like, performance of the fuel cell, which has deteriorated, can be recovered according to a simple gas piping system and method.

When the fuel electrode is maintained at a higher potential level and in a highly humidified condition, adsorbates on the catalyst layer of the fuel electrode can be oxidized and removed, thereby restoring the fuel electrode. Accordingly, performance of the fuel cell, which may have deteriorated, may be recovered using a low cost operation.

When both the fuel electrode and oxidizing electrode are stopped in a hydrogen atmosphere, the fuel electrode is supplied with oxidizing gas to react with hydrogen remained at the fuel electrode, thereby producing water and disposing the fuel electrode in an air atmosphere. In this case, the state of the fuel electrode of the fuel cell and the state of the oxidizing electrode of the fuel cell can be switched to avoid deterioration of the oxidizing electrode. Further, oxidizing gas that is supplied to the fuel electrode mixes well with the remaining hydrogen, thereby producing water so as to effectively remove adsorbates on the catalyst.

When the fuel cell is stopped with the fuel electrode disposed in an air atmosphere and the oxidizing electrode disposed in a hydrogen atmosphere, hydrogen gas is supplied so as to dispose the fuel electrode in a hydrogen atmosphere. Accordingly, the states of the fuel and oxidizing electrodes may be switched, deterioration of the fuel cell may be avoided, and adsorbates can be effectively removed. Further, by stopping the performance recovery operation with both the fuel and oxidizing electrodes disposed in a hydrogen atmosphere, it is possible to avoid deterioration that affects subsequent electrical power generation as the fuel cell is restarted.

When the fuel cell is stopped with the fuel electrode disposed in an air atmosphere and the oxidizing electrode disposed in a hydrogen atmosphere, oxidizing gas is supplied to the fuel electrode and a loading device is applied such that hydrogen remaining at the oxidizing electrode is consumed and the oxidizing electrode is disposed in an air atmosphere. Accordingly, the states of the fuel and oxidizing electrodes may be switched and deterioration of the cell may be avoided. Further, the reaction with any remaining hydrogen at the oxidizing electrode produces water on the catalyst layer of the fuel electrode, and adsorbates may be effectively removed. Further, by stopping the performance recovery operation with both the fuel and oxidizing electrodes disposed in an air atmosphere, it is possible to avoid deterioration as a result of holding for a long period of time the fuel cell at a low power level or in a non-operating condition.

When the fuel cell is stopped with the fuel electrode disposed in an air atmosphere and the oxidizing electrode disposed in a hydrogen atmosphere, the supply of air to the fuel electrode may be discontinued and any oxygen remaining at the fuel electrode may be consumed by applying a loading device. Accordingly, the states of the fuel and oxidizing electrodes may be switched and deterioration of the cell may be avoided. Further, water that is produced on the catalyst of the fuel electrode may be used to effectively remove adsorbates. Further, by stopping the performance recovery operation with both the fuel and oxidizing electrodes disposed in a hydrogen atmosphere, it is possible to avoid deterioration that affects subsequent electrical power generation as the fuel cell is restarted.

With the oxidizing electrode disposed in a hydrogen atmosphere, an external power source may maintain the fuel electrode at 1.0 to 1.2 volts/cell for a predetermined time. Accordingly, the oxidizing electrode can be disposed in a hydrogen atmosphere and the potential of the fuel electrode may be accurately controlled with the external power source. Further, with the fuel electrode disposed in a hydrogen atmosphere, the oxidizing electrode may provide a reference for controlling for the potential level.

A performance recovery operation may include opening a purge valve and operating a fuel electrode circulation pump to draw the oxidizing gas to the fuel electrode from the oxidizing gas supply system. Accordingly, hydrogen and oxygen can be effectively mixed in the fuel electrode circulation system and water can be effectively produced on the catalyst of the fuel electrode. Further, a filter that reduces contamination in air that is drawn from the outside may be provided in connection with the oxidizing gas supply system.

A performance recovery operation may include opening a purge valve and operating a fuel electrode circulation pump to draw the oxidizing gas to the fuel electrode from the oxidizing gas supply system, and to effectively produce water. Further, outside air may be directly drawn from the oxidizing gas discharge system, as opposed to from the oxidizing gas supply system, thereby eliminating an oxidizing gas bypass line around the oxidizing electrode and simplifying the gas system piping.

A performance recovery operation may include opening first and second purge valves, opening a circulation valve, and operating a fuel electrode circulation pump so as to supply oxidizing gas from the oxidizing gas supply system to the fuel electrode. Accordingly, a unidirectional flow of fuel gas in the fuel gas system may quickly dispose the fuel electrode in an air atmosphere. Further, such a performance recovery operation may include any of the oxidizing gas supply systems described above.

A performance recovery operation may include opening first and second purge valves and operating a fuel electrode circulation pump so as to supply oxidizing gas from the oxidizing gas discharge system to the fuel electrode. Accordingly, the fuel electrode may be quickly disposed in an air atmosphere. Further, the arrangement of the oxidizing gas system may be simplified.

A determination as to whether or not to carry out a performance recovery operation on a fuel cell may be based on the period of time during which the fuel cell is continuously operated with a low load. Accordingly, unnecessary performance recovery operations may be avoided.

A determination as to whether or not to carry out a performance recovery operation on a fuel cell may be based on the total accumulation of time during which the fuel cell is operated with a low load. Accordingly, unnecessary performance recovery operations may be avoided.

A determination as to whether or not to carry out a performance recovery operation on a fuel cell may be based on a rate of deterioration of the electrical power generating performance by a fuel cell. Accordingly, unnecessary performance recovery operations may be avoided.

A determination as to whether or not to carry out a performance recovery operation on a fuel cell may be based on a rate of reduction for estimates of the outer surface area of the fuel electrode. Accordingly, unnecessary performance recovery operations may be avoided.

A determination as to the time to maintain the fuel electrode at a high potential during a performance recovery operation may be based on the potential of the fuel electrode, the moisture content of the catalyst layer, and the temperature of the fuel cell. Accordingly, the time for which the fuel electrode is maintained at the higher potential can be minimized, and the performance recovery operation can be carried out with minimal deterioration of the fuel electrode.

A performance recovery operation may include supplying water or humidified gas to the fuel electrode and/or to the oxidizing electrode so as to increase the relative humidity in the fuel cell, and thereby effectively recover performance of the fuel cell.

A performance recovery operation may include lowering the temperature of the fuel cell stack, e.g., by lowering the temperature of individual fuel cells, so as to facilitate and enhance increasing the relative humidity in the fuel cell, and thereby effectively recover performance of the fuel cell.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A method of performing a performance recovery operation on a fuel cell system including a fuel cell for generating electricity, the fuel cell including fuel and oxidizing electrodes disposed respectively on opposite sides of an electrolyte membrane, the fuel cell generating electricity that flows through an external load in response to a fuel gas and an oxidizing gas being supplied respectively to the fuel and oxidizing electrodes, the method of performing a performance recovery operation comprising:

stopping the supply of oxidizing gas to the oxidizing electrode while maintaining the supply of fuel gas to the fuel electrode;

when a voltage across an external load reaches a predetermined voltage: disconnecting the external load and discontinuing the supply of fuel gas to thereby dispose both the fuel electrode and oxidizing electrode in a hydrogen atmosphere;

supplying oxidant gas to the fuel electrode to thereby dispose the fuel electrode in an atmosphere of oxidant gas while the oxidizing electrode is disposed in an atmosphere of hydrogen and further to thereby raise the potential of the fuel electrode to a predetermined level that is higher than occurs during normal operation;

maintaining the higher potential of the fuel electrode for a predetermined time that is based on the voltage of the fuel electrode, a moisture content of the fuel cell, and a temperature of the fuel cell; and discontinuing the performance recovery operation after the predetermined time.

* * * * *